United States Patent Office 3,505,361
Patented Apr. 7, 1970

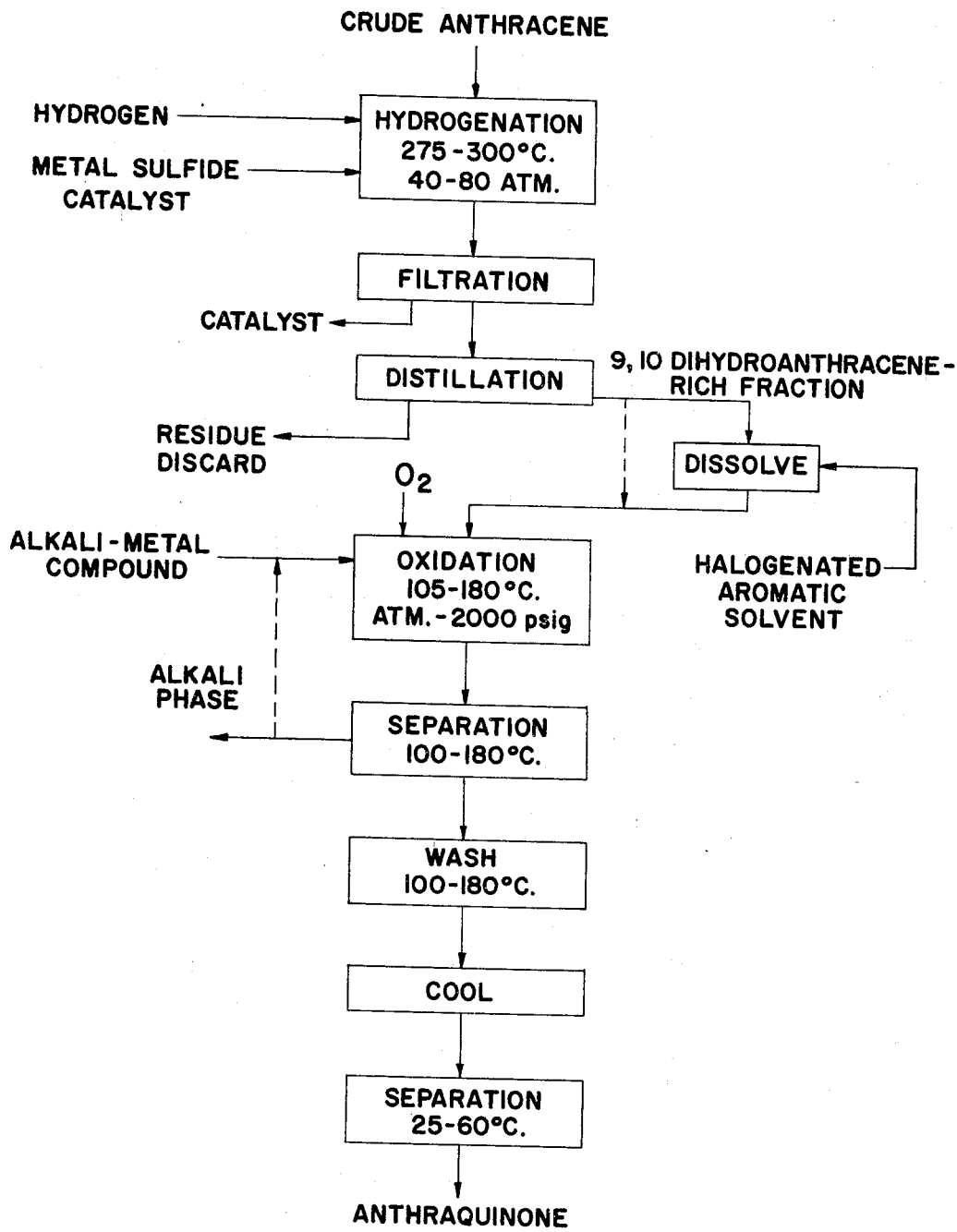

3,505,361
PREPARATION OF ANTHRAQUINONE FROM CRUDE COAL TAR
Nicholas P. Greco, Pittsburgh, Pa., assignor to Koppers Company, Inc., a corporation of Delaware
Continuation-in-part of application Ser. No. 340,561, Jan. 27, 1964. This application Oct. 21, 1965, Ser. No. 499,752
Int. Cl. C07c 49/68
U.S. Cl. 260—369
10 Claims

ABSTRACT OF THE DISCLOSURE

Anthraquinone of high purity is produced from a crude mixture containing anthracene and phenanthrene by preferentially hydrogenating the mixture to provide a 9,10-dihydroanthracene rich fraction and oxidizing this fraction in liquid phase with an oxygen containing gas, using alkali metal or alkaline earth catalysts, at a temperature of 105–150° C. and a pressure of up to 2000 p.s.i.g.

---

This invention relates to the auto-oxidation of anthracene to anthraquinone. In one specific aspect it relates to a method of making anthraquinone from crude coal tar extracts of mixtures of anthracene and phenanthrene. This application is a continuation-in-part of my copending application Ser. No. 340,561 filed Jan. 27, 1964 and now abandoned.

Crude anthracene, which is heretofore not been usable in the manufacture of anthraquinone, is a low cost product derived from coal tar. In the commercial distillation of coal tar, there is obtained a crude anthracene cut, a so-called anthracene oil fraction that is usually cooled, filtered and pressed hot to yield an anthracene cake comprising about 20 to 50 percent anthracene with the remainder predominantly phenanthrene and carbazole. The similarity in physical properties such as boiling points, melting points, and solubility in various solvents has made it difficult to separate and purify the various constituents of the crude extract by conventional procedures such as caustic fusion, vacuum distillation, or solvent extraction.

It is therefor an object of the present invention to produce anthraquinone of high purity and quantitative yields from a crude coal tar fraction containing a mixture of anthracene and phenanthrene.

It is a further object of the present invention to preferentially oxidize 9,10-dihydroanthracene to anthraquinone from a mixture containing 9,10-dihydroanthracene and 9,10-dihydrophenanthrene.

In accordance with the present invention I have discovered a method of making anthraquinone from a crude mixture containing anthracene and phenanthrene by preferentialty hydrogenating the crude mixture to convert the anthracene to 9,10-dihydroanthracene and recovering a fraction rich in the 9,10-dihydroanthracene and thereafter oxidizing the fraction in the liquid phase with a gas containing free oxygen at a preferred temperature of 105 to 150° C. and a pressure of about atmospheric to 2000 p.s.i.g. in the presence of a basic compound. In accordance with this method it is now possible to use a crude coal tar fraction which heretofore had almost no use except for fuel, and by a very inexpensive process produce anthraquinone of high purity and in high yields.

My process involves two steps: a preferential hydrogenation of anthracene to 9,10-dihydroanthracene and a preferential oxidation of 9,10-dihydroanthracene to anthraquinone. The first step, the preferential hydrogenation is illustrated by the equation:

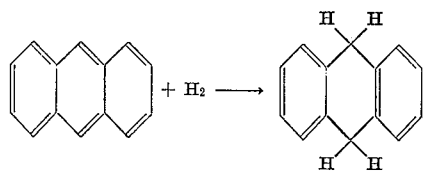

The hydrogenation step can be performed by a conventional procedure, such as that of B. Corson et al., U.S. Patent No. 2,438,148. In accordance with this procedure anthracene cake containing anthracene, carbazole and phenanthrene is hydrogenated in the presence of a metallic sulfide hydrogenation catalyst at a temperature of 275 to 300° C., and at a pressure of 40 to 60 atmospheres for a period of time, about six hours, to obtain a maximum conversion of anthracene to 9,10-dihydroanthracene rich fraction is recovered by filtering the catalyst from the hydrogenation products, istilling the hydroanthracene. The 9,10-dihydroanthracene rich fraction is recovered by filtering the catalyst from the hydrogenation products, distilling the hydrogenation products to separate the 9,10-dihydroanthracene and phenanthrene, and extracting carbazole from the distillation residue with a low boiling aromatic hydrocarbon.

The crude anthracene used in the present invention can be any product containing anthracene in association with other impurities. Usually the crude anthracene comprises a fraction obtained in the distillation of coal tar, a fraction in the so-called anthracene oil range. This crude anthracene will also comprise carbazole and phenanthrene with smaller concentrations of homologs of anthracene and phenanthrene, such as acenaphthene, fluorene, chrysene, and acridine. While the anthracene in such a tar fraction can be selectively hydrogenated, it is usually preferred to concentrate the anthracene, carbazole, and phenanthrene into an anthracene cake by cooling the tar fraction to solidify these high melting constituents and then to remove the liquid constituents by filtration. The resulting cake will comprise about 20 percent to 50 percent anthracene.

The hydrogenation procedure is applicable to any crude product containing anthracene. Of course the subsequent separation of constituents from the hydrogenated product will depend on the chemical and physical properties of the constituents associated with the anthracene or the 9,10-dihydroanthracene.

The crude anthracene is mixed with any one of the usual metal sulfide hydrogenation catalysts such as the sulfides of nickel, cobalt, molybdenum, chromium, manganese, tungsten, vanadium, tin, etc.

The second step in my process is the oxidation preferentially of 9,10-dihydroanthracene to anthraquinone as illustrated by equation:

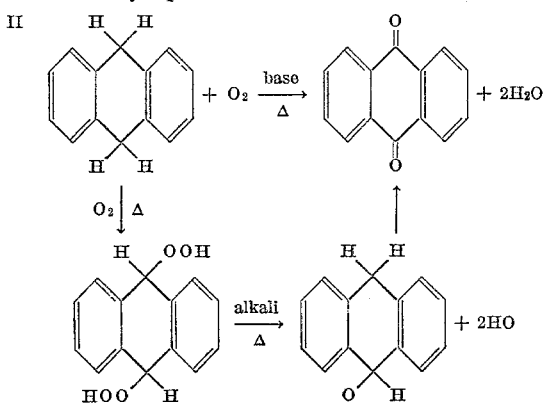

The mechanism for the reaction is not completely understood. The reaction may proceed directly according to Equation II or by the alternate route of peroxide formation and alkaline, free radical decomposition according to Equation II(a).

The starting material for the oxidation reaction, 9,10-dihydroanthracene may contain a minor amount of impurities such as dihydrophenanthrene as for example the product prepared in accordance with the procedure of step 1 above.

The 9,10-dihydroanthracene is oxidized to anthraquinone using free molecular oxygen. Typically a gas containing free molecular oxygen is used which may optionally contain a diluent. While we prefer to use pure oxygen for this purpose, it is also possible to use air or a mixture of oxygen together with an inert gas such as nitrogen.

The oxidation reaction requires the presence of a basic compound. Generally, a strong base, which is readily water soluble, should be used. At the present time the function of the base has not been thoroughly determined and it is believed that the base either assists in the free radical decomposition of the peroxide by thermal means or the peroxide is decomposed by the basic compound. In accordance with the practice of the present invention the presence of acids during the oxidation step should be avoided since in an acidic medium 9,10-dihydroanthracene is converted to anthracene. The preferred bases in the oxidation reaction are the alkali metal hydroxides, carbonates, bicarbonates, and the di- and tri-alkali metal phosphates. The alkali metals included are sodium, potassium, and lithium. Less desirable are the alkaline earth metals such as magnesium, calcium, strontium and barium in the form of the hydroxides and carbonates which while sufficiently basic are not very water soluble and may interfere with the product recovery procedure. The basic compound should be present in a catalytic amount to assist in the peroxide decomposition. Preferably, an amount of up to 10 mole percent per mole of dihydroanthracene is used. A small excess in this amount may be used, but it is not generally desirable to add a large excess thereof.

The oxidation reaction occurs under comparatively mild conditions. The reaction temperature should be in the range of between 105 to 180° C. with a preferred range between 110 and 150° C. When the temperature is above 180° C. the yield is greatly decreased; whereas when the temperature is below 105° C. the reaction becomes too slow. The reaction may be run at a pressure of atmospheric up to about 2000 p.s.i.g. However, generally atomspheric pressure causes the reaction to proceed too slow while a pressure up to the maximum is only applied when the oxidation is performed with a very dilute oxygen containing gas. With pure oxygen, the pressure is preferably maintained at between 200 to 300 p.s.i.g.

It is desirable to perform the oxidation reaction in the presence of an inert solvent which is resistant to oxidation under the reaction conditions. These solvents act as heat transfer agents or as diluents and are water insoluble, thus forming two separate phases during the reaction. Useful solvents should be high boiling to minimize loss due to evaporation and should also be readily recoverable preferably by steam distillation. It is desirable that the anthraquinone formed during the reaction be soluble in the hot solvent but substantially insoluble in the cold solvent to facilitate product separation and product recovery. Useful solvents are the halogenated aromatic solvents such as bromobenzene, chlorobenzene, 1,2-dibromobenzene, 1,3-dibromobenzene, 1,2-dichlorobenzene, 1,3-dichlorobenzene, m-bromochlorobenzene, and 1,2,4-trichlorobenzene. The above solvents are particularly desirable since they are non-reactive during the oxidation reaction, liquids at room temperature, and sufficiently high boiling. Other solvents, which although they react with oxygen under the reaction conditions may be used for product recovery and purification. These include benzene, toluene, xylene, and nitrobenzene. In the situation where large amounts of dihydrophenanthrene are present together with the 9,10-dihydroanthracene, the former may serve as a solvent for the reaction.

Typically, in accordance with my process 9,10-dihydroanthracene having a purity of 96 percent and containing four percent dihydrophenanthrene is prepared from a synthetic mixture of anthracene by hydrogenating at a pressure of 800 p.s.i.g. of hydrogen and at a temperature of 275° C. for a period of six hours in the presence of molybdenum sulfide catalyst. The 9,10-dihydroanthracene mixture is separated from the phenanthrene and carbazole by distillation. Then the 9,10-dihydroanthracene containing a minor portion of dihydrophenanthrene is dissolved in trichlorobenzene and oxidized with oxygen in the presence of a six percent aqueous sodium hydroxide solution at a pressure of 200–300 p.s.i.g. and a temperature of 110–150° C.

After the oxidation step the mass from the reaction upon standing will separate into two phases, an aqueous phase and a halogenated solvent phase. The anthraquinone, of course, is in the halogenated solvent phase. The phases are separated, and upon cooling of the halogenated solvent phase to room temperature, the anthraquinone crystallizes out of solution and the solvent can be filtered off to leave the anthraquinone in the form of bright yellow precipitate.

I have found that to obtain anthraquinone that is of a high degree of purity (99.5+% pure), as needed for example in the dye industry where the use of anthraquinone of lower purity results in the presence of harmful impurities in the resulting dyestuff, that the aqueous phase and the halogenated solvent must be maintained under a pressure above atmospheric but below that at which a reaction takes place until the phases are separated. As an illustration of this step to obtain a high purity anthraquinone using a conventional oxidation vessel and a conventional extraction vessel, the hot reaction mixture from the oxidation vessel is passed through a pressure let-down valve fnto the extraction vessel that is being maintained at a pressure below that at which any appreciable oxidation takes place. Under these conditions, substantially all of the intermediate products are extracted out of the hot halogenated solvent phase into the hot caustic phase. The temperature of the liquids in the extraction vessel should be such that the precipitation of anthraquinone from the halogenated solvent is avoided. Preferably, the oxidation temperature, i.e., 105–180° C., is maintained for the extraction step, but, in practice, usually occurring heat losses may lower the temperature as much as 5–15° C. A temperature as low as about 100° C. has been found to be suitable. The pressure is decreased from the oxidation pressure of 200–300 p.s.i.g. as the liquids flow through the pressure let-down valve from the oxidation vessel to the lower pressure in the extraction vessel, which lower pressure is at least the pressure necessary to retain the water as a liquid in the mixture at the temperature of the extraction. A pressure between atmospheric to about 10 p.s.i.g. is preferred, but any pressure below that at which substantial oxidation reaction occurs can be used. Separation of the phases occurs and the hot halogenated solvent solution is then separated from the caustic phase. The caustic phase, containing the impurities, may be recycled to the reactor for subsequent oxidation.

The halogenated solvent phase is further purified by successive liquid phase extractions, at a temperature sufficient to maintain the anthraquinone in solution, with additional aqueous caustic (to remove any residual impurities), aqueous acid to neutralize the solution, and water to remove any residual acid. The individual washes may be separated into portions and used as such if desired. The hot halogenated solvent is then cooled to precipitate the high purity anthraquinone. The temptature at which crystallization occurs depends, of course, on the concentration of anthraquinone in solution and is accomplished by cooling to about 60° C., but the solution may be cooled to room temperature if desired. The crystallized anthraquinone is then separated from the halogenated solvent by centrifuging, filtering, or other suitable means. This purification technique consistently yields 99.5+% pure anthraquinone.

The process of this invention is schematically illustrated in the accompanying drawing by flow diagram.

The invention is further illustrated by the following examples.

EXAMPLE I

A synthetic blend (48.7% anthracene, 42% phenanthrene, balance unknown) was made from the 15.7% anthracene-67% phenanthrene mixture and a 96% anthracene coal tar extract. A three-gallon stirring autoclave was charged with the molten anthracene-phenanthrene blend, M.P. 175° C., in five batches of 4–5 kilograms and 528 g. of Harshaw molybdenum sulfide catalyst. The autoclave was heated to 250° during the charging to minimize freezing of the anthracene as it was added through the charging port in the autoclave cover. The system was purged twice with nitrogen to 400 p.s.i.g. and hydrogen pressured to 800 p.s.i.g. Hydrogen was absorbed while heating and the reaction was maintained for six hours at 275° C. and 800 p.s.i.g. Under these conditions nearly all the anthracene was converted to dihydroanthracene with only a slight amount of dihydrophenanthrene being formed. At the end of the hydrogenation the stirrer was turned off to allow the catalyst to settle and the autoclave was cooled and vented. The hydrogenate (M.P. 98°) was siphoned leaving a three inch heel of catalyst and hydrogenate in the autoclave. Four additional charges were hydrogenated under identical conditions using the original catalyst. The catalyst was finally removed with the last batch hydrogenated and recovered by filtering hot through a steam-heated Buchner funnel. The hydrogenate in the catalyst was recovered with xylene. The overall material balance for the hydrogenation is presented in Table I and the analyses of the hydrogenates in Table II.

TABLE I

Hydrogenation of 48.7% anthracene

Conditions: 275° C., 6 hrs., 800 p.s.i.g. of $H_2$, $MoS_2$ catalyst—

|   | G. |
|---|---|
| Charge to autoclave | 24,812 |
| Hydrogen absorption (theory calculated) | 124 |
| Total | 24,936 |
| Product from autoclave | 24,549 |
| Loss [1] 1.5% | 387 |

[1] Organic sulfur compounds present (about 1%) are hydrogenated to $H_2S$ and lost in the vent gas to account for some of this loss.

TABLE II.—ANALYSIS OF THE PRODUCT FROM THE HYDROGENATION OF ANTHRACENE

| Batch | Anthracene | Dihydroanthracene [1] | Phenanthrene | Dihydrophenanthrene |
|---|---|---|---|---|
| 1 | 1.4 | 49 | 37 | 5 |
| 2 | 1.3 | 48 | 36 | 4 |
| 3 | 1.3 | 47 | 38 | 5 |
| 4 | 1.2 | 46 | 37 | 5 |
| 5 | 1.2 | 48 | 37 | 5 |

[1] The dihydroanthracene yield was 96–97% based on analysis of residual anthracene in the hydrogenate and on the anthracene content of the charge.

The combined hydrogenate was distilled through a glass column containing 36 inches of 0.24″ x 0.24″ stainless steel packing from a 22-liter stainless steel pot in two batches at 20 mm. with a 10:1 reflux ratio. The products obtained are shown in Table III.

TABLE III.—DISTILLATION OF DIHYDROANTHRACENE

| Boiling point of fraction at 20 mm. | Wt. percent of charge [1] | Product and remarks |
|---|---|---|
| 143–177° | 1.38 | Not identified. |
| 177–183° | 47.2 | 96% dihydroanthracene,[2] 4% dihydrophenanthrene, <0.024% anthracene <1% phenanthrene. |
| 183–195° | 9.3 | Intermediates,[3] 30% dihydroanthracene, 30% phenanthrene, 4% dihydrophenanthrene, 0.5% anthracene. |
| Residue [4] | 42 | |

[1] Charge 24,478 g.
[2] Yield of recovered dihydroanthracene is 94–95% based on anthracene charged for hydrogenation.
[3] Recycle of intermediates to the still would raise recovered dihydroanthracene yield 3%.
[4] No attempt was made to recover phenanthrene from the residue.

The mild hydrogenation of anthracene in an anthracene-phenanthrene-carbazole cut is selective for anthracene (one mole of hydrogen per mole of anthracene) when carried out at 275° and 700 to 1300 p.s.i.g. of hydrogen over molybdenum sulfide catalyst. After six hours of hydrogenation at the above conditions, 96% of the anthracene was hydrogenated to 9,10-dihydroanthracene and approximately 8% of the phenanthrene to 9,10-dihydrophenanthrene. Carbazole was not hydrogenated. The 9,10-dihydroanthracene, being lower boiling may be separated by distillation from the phenanthrene, and from the carbazole. Dihydrophenanthrene has nearly the same boiling point as the dihydroanthracene and as a result the two compounds are obtained as a mixture when distilled. Thus, product containing a mixture of 96% dihydroanthracene and 4% dihydrophenanthrene was obtained.

EXAMPLE II

The autooxidation of a mixture of dihydroanthracene and dihydrophenanthrene with oxygen under moderate pressure showed that the dihydroanthracene was oxidized to 9,10-anthraquinone in near quantitative yield whereas the dihydrophenanthrene remained unreacted.

Dihydrophenanthrene (450 g.; purity 87%—contains 13% dihydroanthracene as determined by analysis) and sodium bicarbonate (150 g. of 6% aqueous solution) was stirred at 110° in a stainless steel autoclave under 300 p.s.i.g. of oxygen until absorption of oxygen ceased (6 hours). The product was removed hot from the autoclave and the anthraquinone that crystallized in light yellow needles on cooling was filtered. The autoclave was rinsed with acetone to recover all of the anthraquinone. The anthraquinone and acetone rinsings from the autoclave were added to the anthraquinone on the filter; 66 g. (98% yield), M.P. 285°, lit. 285°. I.R. spectra indicated authentic anthraquinone. The filtrate was distilled at 174–178°/ 20 mm. and gave 386 g. of dihydrophenanthrene (96.5% recovery).

EXAMPLE III

The purpose of this experiment was to repeat Example II using a synthetic sample made with pure dihydrophenanthrene and dihydroanthracene.

A mixture of dihydroanthracene (90 g., 0.5 mole, Terra Chemical Co., purity 98–99%) and dihydrophenanthrene (810 g., 4.5 moles, Terra Chemical Co., purity 98–99%) was oxidized in the presence of sodium bicarbonate (250 g. of 6% aqueous solution) at 111–113° and 300 p.s.i. of oxygen for 12 hours to give 104 g. (100% yield) of anthraquinone (M.P. 285°, lit. 285°) in light yellow needles.

EXAMPLE IV

Dihydroanthracene (60 g., purity 96%, contains 4% dihydrophenanthrene, <0.024% anthracene and <1% phenanthrene) dissolved in trichlorobenzene (1000 ml.) sodium bicarbonate (15 g.), and water (68 g.) were added to a one-gallon stainless steel stirring autoclave. Oxygen, to 300 p.s.i.g. was pressured in and the reactor and contents heated to 120° C. Oxygen was vented during the heating period to maintain the pressure at 300 p.s.i.g. When the reaction temperature was reached, the pressure was maintained by a regulator attached to a calibrated oxygen reservoir. The pressure drop on the reservoir was recorded as the reactants absorbed oxygen. After absorption of oxygen had ceased, the autoclave was vented and the hot product siphoned off. Trichlorobenzene (500 ml.) was used to rinse the reactor. The rinsings were added to the product and the solution allowed to cool to room temperature. The anthraquinone formed bright yellow needles which were filtered. The trichlorobenzene filtrate was separated from the aqueous phase and the aqueous phase discarded. The bicarbonate solution added to the oxidation reactor had a pH 7.6 and after oxidation the aqueous phase had a pH 9.3. The solid on the filter was washed with water and then with acetone (250 ml.) to give 43 g. (65% yield) of anthraquinone, M.P. 285° C. (theory 285° C.). The trichlorobenzene filtrate was distilled at 95°/5 mm. essentially to dryness. The distillation residue was rinsed out of the flask with acetone, filtered, washed with water and then finally with acetone, and dried on a steam bath. The weight of this second batch of anthraquinone was 13.5 g. (20% yield, M.P. 230–240° C.).

EXAMPLE V

Following the procedure of Example IV, a study of some of the process variables in the oxidation of dihydroanthracene to anthraquinone was made. The results are shown in Table IV below. The data indicates that basic conditions are required for the reaction to give reasonably pure anthraquinone. When the oxidation was carried out under acid conditions (pH 5.6) only a trace of anthraquinone was formed. In the absence of both sodium bicarbonate and water, in the presence of sodium bicarbonate without added water, and in the presence of sodium bicarbonate with limited amounts of water, considerable anthracene was formed.

The indicated optimum reaction temperature seems to be in the range of 110–130° C. At lower temperatures the reaction rate was considerably slower. Optimum reaction pressures in the range of 200–300 p.s.i.g. are indicated. At a reaction pressure of 55–75 p.s.i.g. the rate of oxidation was comparatively slow.

TABLE IV.—OXIDATION OF DIHYDROANTHRACENE WITH OXYGEN

Reactor: One-gallon stainless steel autoclave equipped with stirrer
Charge: 60 g. dihydroanthracene (96% purity) in 1,000 ml. of trichlorobenzene (all experiments except "G")

| Expt. | pH | $H_2O$, ml. | NaOH, g. | Temp., °C. | Time, hrs. | $O_2$, p.s.i.g. | Yield, percent of theory | |
|---|---|---|---|---|---|---|---|---|
| | | | | | | | Anthracene | Anthraquinone |
| A | 14.0 | 68 | 4 | 120 | 14 | 300 | 5.3 | 85 |
| B | 14.0 | 68 | 4 | 120 | 11 | 300 | 5.5 | 74 |
| C | 14.0 | 136 | 8 | 120 | 20.5 | 300 | 5.0 | 77 |
| D | 14.0 | 204 | 12 | 120 | 21 | 300 | 8.3 | 75 |
| E | 14.0 | 68 | 8 | 120 | 20 | 300 | 7.9 | 74 |
| F | 14.0 | 68 | 8 | 150 | 6 | 300 | 27.4 | 66 |
| Recycle experiment with a maintained 14% solution of dihydroanthracene in trichlorobenzene | | | | | | | | |
| G | 14.0 | [1] 68 | 4 | 110–115 | 0.5 | [2] 200–300 | 2.2 | [3] 92 |
| H | 5.6 | 68 | 15 ($NaH_2PO_4$) | 115 | 10 | 300 | 12.5 | Trace |
| I | | None | None ($NaHCO_3$) | 120 | 8.75 | 300 | 33 | 34 |
| J | | None | 4 | 120 | 3.3 | 300 | 17 | 59 |
| K | [4] 7.6–10.3 | 68 | 4 | 120 | 6.2 | 300 | [5] 4 | 83 |
| L | [4] 7.6–10.3 | 68 | 4 | 113 | 23 | 200 | [5] 2 | 81 |
| M | [4] 7.6–10.3 | 68 | 4 | 120 | 50 | 50–75 | [5] 2 | 77 |

[1] Amount of $H_2O$ and NaOH/60 g. of dihydroanthracene, actual quantity in this experiment was approximately four times as much.
[2] Four cycles at 300 p.s.i.g., two cycles at 200 p.s.i.g.
[3] Yield of anthraquinone based on converted dihydroanthracene (see Example VI).
[4] Initial pH of 7.6; final pH of 10.3; explained by fact that on heating $NaHCO_3$ is converted to $Na_2CO_3$.
[5] Includes only anthracene in separated anthraquinone; acetone wash probably contained some anthracene which was not determined.

EXAMPLE VI

The previous examples on the oxidation of dihydroanthracene in trichlorobenzene solution were made with low concentrations (4% by weight or 6% by volume). As a result of the low concentration the reaction time for the pressure oxidation required about 14 hours for completion and an optimum temperature of 120° C. under 300 p.s.i.g. of oxygen. A slight induction period (about five minutes) usually occurred with low concentration. Under these conditions some anthracene (5% yield) was formed as a by-product. The 4% concentration was purposely used so that the anthraquinone formed would be entirely in solution and conveniently removed from the reactor.

In this experiment a more concentrated solution of dihydroanthracene in trichlorobenzene (14.4% by weight) was used. The oxidation was carried out so that about 25% of the dihydroanthracene charged was converted, i.e., 25% yield/pass, to anthraquinone. After removal of the anthraquinone, sufficient make-up dihydroanthracene was added to the trichlorobenzene so as to maintain a constant concentration. The oxidation was carried out to the extent that anthraquinone formed would be soluble in the trichlorobenzene. Over-oxidation per cycle was purposely avoided so as to prevent too high a concentration of anthraquinone as a slurry from the reactor. As a result of working with a higher concentration of dihydroanthracene the reaction time was reduced the absence of an induction period with a lowering of the from 14 hours to 0.5 hour. The oxidation took place in reaction temperature from 120° C. to 112° C. The oxygen pressure could also be reduced from 300 p.s.i.g. to 200 p.s.i.g. without affecting this more favorable rate of oxygen absorption.

Anthrancene formed as a by-product in the anthraquinone process was also reduced (5% to 2.3% yield) due to the lower reaction temperature. The addition of dihydroanthracene with subsequent removal of anthraquinone was repeated five times. The aqueous caustic solution was recycled with the unreacted dihydroanthracene. After six cycles the rate of oxidation was unchanged indicating recycling of dihydroanthracene with additional make-up dihydroanthracene could be continued until buildup of by-products such as anthracene and dihydrophenanthrene which is not oxidized in the process become sufficiently large as to depress the speed of oxidation or effect the quality of the product. The quality of the anthraquinone made in the process indicated high purity by mixed melting point with authentic anthraquinone. The high purity of the anthraquinone was obtained by washing the product on the filter with trichlorobenzene and also by washing the hot solution of anthraquinone from the reactor with water until it was free of the sodium hydroxide used as the catalyst in the process. In this experiment recycling was not continued beyond the sixth cycle but at that time the yield of anthraquinone based on the dihydroanthracene charged was 92%. Recycling of anthracene to the hydrogenator would raise the yield about 2%. The loss in the process of about 5 to 6% was probably mechanical.

Trichlorobenzene (1000 ml.) containing dihydroanthracene (240 g. purity, 96% containing 4% dihydrophenanthrene) and 272 ml. of 6% aqueous sodium hydroxide solution were added to a one-gallon stainless steel stirring autoclave. Oxygen, to 300 p.s.i.g., was pressured in and the reactor and contents heated to 112° C. Oxygen was vented during the heating period to maintain the pressure at 300 p.s.i.g. When the reaction temperature was reached the pressure was maintained by a regulator attached to a calibrated oxygen reservoir. Oxygen was immediately absorbed with an exotherm and cooling was required to keep the temperature between 112–114° C. Oxygen was absorbed for 30 minutes or until about 60 g. of anthraquinone was formed. This was equivalent to 45 p.s.i.g. pressure drop on the oxygen reservoir or 0.66 mole of oxygen. The stirrer was stopped and the product pressured out of the reactor through a dip pipe while hot. The reaction mixture was kept hot, the aqueous caustic layer was returned to the reactor, and the trichlorobenzene solution of anthraquinone and unreacted dihydroanthracene washed with boiling water until neutral (2×1000 ml.). The trichlorobenzene solution was cooled to room temperature and the anthraquinone crystals collected on a centrifuge, washed with 100 ml. of trichlorobenzene and steamed until free of trichlorobenzene. The yield of anthraquinone was 65 g., M.P. 285° C. (theory 285° C.).

The mother liquor from the centrifuge was recycled to the autoclave with more dihydroanthracene (58.5 g.) to bring the concentration again to 14.4 weight percent and the cycle repeated. After the third cycle a pressure of 200 p.s.i.g. of O₂ was used for the fourth and fifth cycles. The reaction time was the same as under 300 p.s.i.g. of O₂. At the start of the sixth cycle dihydroanthracene was not added and to maintain the concentration at a constant level 200 ml. of trichlorobenzene was distilled from the mother liquor. The experiment was stopped after the sixth cycle because further concentration would reduce the volume too small for the size of the oxidation reactor. The mother liquor was finally distilled to dryness. The analysis of the residue, material balance, and anthraquinone yield is shown in Tables V and VI.

TABLE V.—OXIDATION OF DIHYDROANTHRACENE TO ANTHRAQUINONE

Solvent: Trichlorobenzene
Condition: 112–114° C., 200–300 p.s.i. of O₂, 30 min.
Catalyst: 272 ml. of 6% of aqueous NaOH

| No. of Cycle | Dihydro-anthracene [1] (grams) | Anthra-quinone (grams) | Melting point [2] (° C.) | Reaction time (min.) | Oxygen pressure (p.s.i.g.) |
|---|---|---|---|---|---|
| 1 | 240 | 65 | 285 | 30 | 300 |
| 2 | 58.5 | 49.1 | 285 | 26 | 300 |
| 3 | 44.0 | 55.7 | [3] 283 | 24 | 300 |
| 4 | 50.7 | 50.1 | [3] 275 | 30 | 200 |
| 5 | 45.1 | 71.4 | 285 | 31 | 200 |
| 6 | None 438.3 | 63.0 | 285 | 30 | 300 |

Residue 108 g.
Analysis of residue: 70% dihydroanthracene, 15% dihydrophenanthrene 7.1% anthracene, 7.9% anthraquinone.
[1] Pilot plant dihydroanthracene purity 96%, dihydrophenanthrene 4%.
[2] Melting point of anthraquinone theory=285° C.
[3] Not washed sufficiently while in solution melting point indicated impurity present.

TABLE VI.—MATERIAL BALANCE

| Charge to reactor: | Grams |
|---|---|
| Dihydroanthracene | 420.0 |
| Dihydrophenanthrene | 18.3 |
| Oxygen (calculated) | 121.0 |
| | 559.3 |
| Product from reactor: | |
| Dihydroanthracene | 75.5 |
| Dihydrophenanthrene | 16.3 |
| Anthracene | [1] 7.7 |
| Anthraquinone | [2] 362.8 |
| Water (calculated) | 69.0 |
| | 531.3 |

Loss (mechanical) approximately 6% (28 g.)
[1] 2.3% yield.
[2] 91.2% yield.

EXAMPLE VII

A mixture of 99% dihydroanthracene and 1% dihydrophenanthrene was dissolved in trichlorobenzene to obtain a solution containing 7.8% by weight of dihydroanthracene in trichlorobenzene solution. This solution was fed continuously to a stirred autoclave operating under a pressure of 300 p.s.i.g. oxygen, at a temperature of 150° C. Also, an aqueous sodium carbonate solution (6% by weight) was fed to the reactor at a ratio of one pound of aqueous carbonate solution for each six pounds of trichlorobenzene solution. In the reactor the two solutions were mixed by agitating and contacted with gaseous oxygen. The residence time in the reactor is sufficient (ca. 1 hour) to convert 92 percent of the dihydroanthracene to anthraquinone. The reaction product, a liquid mixture from the reactor was discharged continuously to an extraction vessel maintained at 150° C. and 70 p.s.i.g. The super atmospheric pressure is required to prevent the water from boiling at this temperature. This extraction vessel was large enough for the liquid to reach a quiescent state and separate into phases. The lower pressure also permits the oxygen to separate from the liquid. The oxygen was removed from the vessel. The trichlorobenzene phase and the alkaline phase were separated by decantation and removed from the extraction vessel. The alkaline phase was recycled to the oxidation reactor. The trichlorobenzene phase was mixed in a wash vessel with an aqueous caustic solution (6% NaOH) and then washed with a dilute sulfuric acid wash and then washed with water. Careful temperature control of the trichlorobenzene solvent phase was maintained at 150° C. to prevent crystallization of anthraquinone during the washing procedure.

The trichlorobenzene phase was then cooled to 60° C., whereupon the anthraquinone crystallized. The slurry was fed to a centrifuge and the anthraquinone separated and dried. The anthraquinone was analyzed and found to be 99.5+% pure.

I claim:
1. A method of making anthraquinone from a crude mixture containing anthracene, carbazole, and phenanthrene comprising the steps of:
   (a) hydrogenating said crude mixture to convert the anthracene to 9,10-dihydroanthracene and recovering a fraction rich in 9,10-dihydroanthracene;
   (b) oxidizing said fraction in the liquid phase with a gas containing free oxygen at a temperature of 105–180° C. and at a pressure of about atmospheric to 2000 p.s.i.g. in the presence of a base selected from alkali metal hydroxide, carbonate, bicarbonate, di- and tri-phosphates and alkaline earth metal hydroxides and carbonates to convert said fraction to anthraquinone; and
   (c) recovering the anthraquinone.

2. A method of making anthraquinone comprising the steps of:
   (a) contacting anthracene in the presence of metallic sulfide hydrogenating catalyst at a temperature of 275–300° C. and a pressure of 40–80 atmosphere with hydrogen to convert the anthracene to 9,10-dihydroanthracene;
   (b) contacting the 9,10-dihydroanthracene in an inert liquid solvent with a gas containing free oxygen at a temperature of 105–180° C. and at a pressure of about atmospheric to 2000 p.s.i.g. in the presence of an aqueous alkaline solution containing a base selected from alkali metal hydroxides, carbonates, bicarbonates, di- and tri-phosphates and alkaline earth metal hydroxides and carbonates to convert the 9,10-dihydroanthracene to anthraquinone; and
   (c) recovering the anthraquinone.

3. An improvement in the method of making anthraquinone from a crude mixture containing anthracene, carbazole, and phenanthrene by hydrogenating the crude mixture to convert the anthracene to 9,10-dihydroanthracene comprising forming a solution of the 9,10-dihydroanthracene in an inert halogenated aromatic solvent, treating the 9,10-dihydroanthracene solution in the liquid phase with a gas containing free oxygen at a temperature of 105–180° C. and at a pressure of about atmospheric to 2000 p.s.i.g. in the presence of an aqueous alkali solution containing a base selected from alkali metal hydroxides, carbonates, bicarbonates, di- and tri-phosphates and alkaline earth metal hydroxides and carbonates to convert the 9,10-dihydroanthracene to anthraquinone and recovering the anthraquinone.

4. A method of making anthraquinone from a crude mixture containing anthracene and phenanthrene comprising hydrogenating said crude mixture to convert the anthracene to 9,10-dihydroanthracene and recovering a fraction rich in 9,10-dihydroanthracene; dissolving said fraction in an inert halogenated aromatic solvent to form a solution; treating said solution in the liquid phase with an oxygen containing gas at a temperature of 110–130° C. and at a pressure of 200–300 p.s.i.g. in the presence of an aqueous alkali solution containing a base selected from alkali metal hydroxides, carbonates, bicarbonates, di- and tri-phosphates and alkaline earth metal hydroxides and carbonates to convert 9,10-dihydroanthracene to anthraquinone and recovering the anthraquinone.

5. Method according to claim 4 in which the anthraquinone is recovered by:
   (a) separating halogenated solvent from the aqueous alakli solution, at a temperature above 100° C. and at a pressure above atmospheric pressure but below that at which the reaction occurs;
   (b) washing the separated halogenated solvent with successive portions of aqueous base, aqueous acid, and water;
   (c) cooling the solution thus obtained to precipitate crystalline anthraquinone; and
   (d) separating the anthraquinone from the solution.

6. An improvement in the method of making anthraquinone by initially hydrogenating the anthracene to 9,10-dihydroanthracene comprising forming a solution of the 9,10-dihydroanthracene in an inert halogenated aromatic solvent; treating said solution in the liquid phase with a gas containing free oxygen at a temperature of 110–130° C. and at a pressure of 200–300 p.s.i.g. in the presence of an aqueous alkali solution containing a base selected from alkali metal hydroxides, carbonates, bicarbonates, di- and tri-phosphates and alkaline earth metal hydroxides and carbonates to convert the 9,10-dihydroanthracene to anthraquinone and recovering the anthraquinone.

7. A method of making anthraquinone comprising oxidizing 9,10-dihydroanthracene in the liquid phase with a gas containing free oxygen at a temperature of 105–180° C. and at a pressure of about atmospheric to 2000 p.s.i.g. in the presence of a base selected from alkali metal hydroxides, carbonates, bicarbonates, di- and tri-phosphates and alkaline earth metal hydroxides and carbonates to convert 9,10-dihydroanthracene to anthraquinone and recovering the anthraquinone.

8. A method of making anthraquinone from a mixture containing 9,10-dihydroanthracene and 9,10-dihydrophenanthrene comprising forming a solution of said mixture in an inert halogenated aromatic solvent, treating said solution in the liquid phase with a gas containing free oxygen at a temperature of 110–130° C. and at a pressure of 200–300 p.s.i.g., in the presence of an aqueous alkali solution containing a base selected from alkali metal hydroxides, carbonates, bicarbonates, di- and tri-phosphates and alkaline earth metal hydroxides and carbonates to convert 9,10-dihydroanthracene to anthraquinone and recovering the anthraquinone.

9. A method of making high purity anthraquinone from anthracene cake containing anthracene, carbazole, and phenanthrene comprising the steps of:
   (a) hydrogenating anthracene cake in the presence of metallic sulfide hydrogenating catalyst at a temperature of 275–300° C. and a pressure of 40.80 atmospheres to convert the anthracene to 9,10-dihydroanthracene;
   (b) filtering the catalyst from the hydrogenation products;
   (c) distilling the hydrogenation products to separate 9,10-dihydroanthracene from phenanthrene and carbazole;
   (d) forming a solution of 9,10-dihydroanthracene in trichlorobenzene;
   (e) oxidizing the 9,10-dihydroanthracene solution in the liquid phase with oxygen at a temperature of 110–180° C. and at a pressure of 200–300 p.s.i.g. in the presence of a catalytic amount of an aqueous sodium hydroxide solution;
   (f) separating the trichlorobenzene phase from the aqueous phase; and
   (g) cooling and filtering the trichlorobenzene phase to recover the anthraquinone.

10. A method of making high purity anthraquinone from anthracene cake containing anthracene, carbazole, and phenanthrene comprising the steps of:
   (a) hydrogenating anthracene cake in the presence of metallic sulfide hydrogenating catalyst at a temperature of 275–300° C. and a pressure of 40–80 atmospheres to convert the anthracene to 9,10-dihydroanthracene;
   (b) filtering the catalyst from the hydrogenation products;
   (c) distilling the hydrogenation products to separate 9,10-dihydroanthracene from phenanthrene and carbazole;

(d) forming a solution of 9,10-dihydroanthracene in trichlorobenzene;

(e) oxidizing the 9,10-dihydroanthracene solution in the liquid phase with oxygen at a temperature of 110–180° C. and at a pressure of 200–300 p.s.i.g. in the presence of a catalytic amount of an aqueous sodium hydroxide solution;

(f) separating the trichlorobenzene phase from the aqueous phase, at a temperature above 100° C. and at a pressure above atmospheric pressure but below that at which oxidation occurs;

(g) washing the separated trichlorobenzene phase with successive portions of aqueous base, aqueous acid, and water;

(h) cooling the solution thus obtained to precipitate crystalline anthraquinone; and (i) separating the anthraquinone from the solution.

References Cited

UNITED STATES PATENTS

| | | |
|---|---|---|
| 2,438,148 | 3/1948 | Corson et al. |
| 3,163,657 | 12/1964 | Morgan et al. ___ 260—369 XR |

LORRAINE A. WEINBERGER, Primary Examiner

HAROLD C. WEGNER, Assistant Examiner

U.S. Cl. X.R.

260—385